US007132973B2

(12) United States Patent
Jindal

(10) Patent No.: US 7,132,973 B2
(45) Date of Patent: Nov. 7, 2006

(54) UNIVERSAL SOFT REMOTE CONTROL

(75) Inventor: Dinesh K. Jindal, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 318 days.

(21) Appl. No.: 10/600,095

(22) Filed: Jun. 20, 2003

(65) Prior Publication Data

US 2004/0257259 A1 Dec. 23, 2004

(51) Int. Cl.
*G08C 19/12* (2006.01)
*G04L 17/02* (2006.01)
*G05B 19/02* (2006.01)
*H04B 7/14* (2006.01)
*H04B 10/00* (2006.01)

(52) U.S. Cl. ........................ 341/176; 341/173; 341/23; 340/5.61; 340/5.62; 340/5.63; 340/825.22; 340/825.69; 340/825.72; 348/14.05; 348/734; 398/111; 398/112; 398/113; 455/151.1

(58) Field of Classification Search ................ 341/176, 341/173, 23; 340/825.22, 825.69, 5.61–5.63, 340/825.72; 348/14.05, 734; 398/111–113; 455/151.1

See application file for complete search history.

(56) References Cited

U.S. PATENT DOCUMENTS 6,437,836 B1 * 8/2002 Huang et al. ............... 348/734
6,496,122 B1 * 12/2002 Sampsell ............... 340/825.69
6,788,241 B1 * 9/2004 Arling et al. ............... 341/176

* cited by examiner

*Primary Examiner*—Jeffery Hofsass
*Assistant Examiner*—Sisay Yacob

(57) ABSTRACT

A universal remote control (10) is provided for wireless remote control of one or more devices (D1 . . . Dn) equipped for remote control by respective original remote controls having visual appearances different from one another. The universal remote control (10) includes: a memory (40) that stores one or more descriptions associated with one or more original remote controls that are selectively emulated by the universal remote control (10), the descriptions including information describing the visual appearances of the original remote controls that the descriptions are associated with; and, a graphical user interface (20) upon which is displayed a representation of one of the original remote controls selected for emulation by the universal remote control (10), the representation having a visual appearance substantially the same as the original remote control being emulated.

22 Claims, 4 Drawing Sheets

| RC NAME | | |
|---|---|---|
| VISUAL APPEARANCE INFORMATION | | |
| BUTTON MAP | | |
| PHYSICAL BUTTON | GUI COORDINATES | TX SIGNAL |
| B1 | (X1, Y1) | S1 |
| B2 | (X2, Y2) | S2 |
| ... | ... | ... |
| Bn | (Xn, Yn) | Sn |

FIGURE 4

UNIVERSAL SOFT REMOTE CONTROL

FIELD

The present invention relates to the wireless remote control arts. It finds particular application in conjunction with consumer electronics, and will be described with particular reference thereto. However, it is to be appreciated that the present invention is also amenable to other like applications.

BACKGROUND

As is known, a variety of consumer electronics (e.g., televisions, radios, audio receivers, audio cassette decks, turn tables, compact disc (CD) players, video cassette records (VCRs), digital video disc (DVD) players, satellite receivers, cable boxes, other audio and/or video equipment, electronic appliances, lighting fixtures and/or ceiling fans, etc.) come equipped with wireless remote controls. A remote control (RC) of this type typically includes a keypad comprising a plurality of physical buttons or keys. The keypad is used by a user to effect wireless remote operation of the corresponding device, e.g., via an infrared or radio frequency interface. Notably, many RCs included with consumer electronics are designed to operate only the specific device or devices that they accompany.

Commonly, a user may have a plurality of devices and corresponding RCs. Users tend to find having an array of RCs burdensome. A collection of different RCs for multiple devices may be viewed as cluttering a user's living space, and users may find it confusing or undesirable to have to remember which RC operates which device. Occasionally, a manufacture may program a remote control to operate a plurality of associated devices provided by that manufacture. However, incompatibility between RCs and devices from different manufactures can be experienced.

RCs have been developed, commonly referred to as universal remote controls (URCs), that are capable of being programmed by a user to operate a variety of different devices provided by a variety of different manufactures. In effect, the URC replaces or mimics a plurality of otherwise distinct RCs. However, the previously developed URCs have been found to have certain limitations. Typically, they are only capable of supporting a small fixed number (e.g., 3 or 4) of specific related devices, e.g., a television, cable box, VCR and DVD player. That is to say, they are designed to replace or mimic a fixed set of specific RCs.

Additionally, the previously developed RCs often cannot or do not provide all the functions of the original RC it's replacing or mimicking. Commonly, the keypad of the URC is hard-wired with a fix configuration of physical buttons. Accordingly, a given URC may not contain all the buttons designated for every function on the original RC being replaced. Furthermore, where devices have similar functions, e.g., as may otherwise be associated with a button having similar or the same designations, operation of the URC can be confusing to the extent that the user may not readily recognize the device being controlled with that button.

Programming previously developed URCs can also be tedious, confusing and/or overly burdensome for users. For example, a code is entered for each original RC that the URC is replacing or mimicking or for each device the URC is to support. That is to say, the URC is programmed to mimic a fix number of specific original RCs. The entered codes then identify those original RCs (or their corresponding devices) that the URC is to replace. However, the URC in this case is limited to replacing or mimicking only those RCs for which the URC has the appropriate programming. That is to say, it is often the case that the URC is only capable of mimicking those RC from manufacturing years that precede the manufacturing year of the URC insomuch as the specifications of subsequently manufactured RCs and/or their associated devices were not available at the time the URC was initially programmed.

Another drawback to many previously developed URCs is a lack of user familiarity. A user may become accustom to the appearance, feel and keypad layout of the original RC provided with a particular device. Accordingly, it can be confusing and/or uncomfortable when the user employs a URC that does not have the same look or feel. Importantly, when the URCs keypad does not have the same layout and/or configuration as the original RC it is mimicking, the functions of particular buttons on the original RC have to be transposed to physical buttons on the URC that have dissimilar locations and/or dissimilar appearances. This can be confusing to users.

Accordingly, the present invention contemplates a new and improved universal remote control that overcomes the above-referenced problems and others.

SUMMARY

In accordance with an aspect of the present invention, a universal remote control is provided for wireless remote control of one or more devices equipped for remote control by respective original remote controls having visual appearances different from one another. The universal remote control includes: a memory that stores one or more descriptions associated with one or more original remote controls that are selectively emulated by the universal remote control, the descriptions including information describing the visual appearances of the original remote controls that the descriptions are associated with; and, a graphical user interface upon which is displayed a representation of one of the original remote controls selected for emulation by the universal remote control, the representation having a visual appearance substantially the same as the original remote control being emulated.

In accordance with another aspect of the present invention, a method is provided for emulating one or more original remote controls having visual appearances that are different from one another. The method includes: storing descriptions of each original remote control to be emulated, the descriptions including information describing the visual appearances of the original remote controls to which the descriptions apply; determining which one of the original remote controls to emulate; and, displaying a replica of the original remote control being emulated, the replica having a visual appearance substantially the same as the original remote control being emulated.

In accordance still another aspect of the present invention, a universal remote control is provided for emulating one or more original remote controls having visual appearances that are different from one another. The universal remote control includes: means for storing descriptions of each original remote control to be emulated, the descriptions including information describing the visual appearances of the original remote controls to which the descriptions apply; means for determining which one of the original remote controls to emulate; and, means for displaying a replica of the original remote control being emulated, the replica having a visual appearance substantially the same as the original remote control being emulated.

Numerous advantages and benefits of the present invention will become apparent to those of ordinary skill in the art upon reading and understanding the present specification.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIG. 4 is a table showing an exemplary data record for an original remote control including a description and/or specification therefor in accordance with aspects of the present invention.

DETAILED DESCRIPTION OF PREFERRED EMBODIMENTS

For clarity and simplicity, the present specification shall refer to structural and/or functional elements, standards, protocols and other components that are commonly known in the art without further detailed explanation as to their configuration or operation except to the extent the same has been modified or altered in accordance with and/or to accommodate aspects of the present invention.

Figure 1:
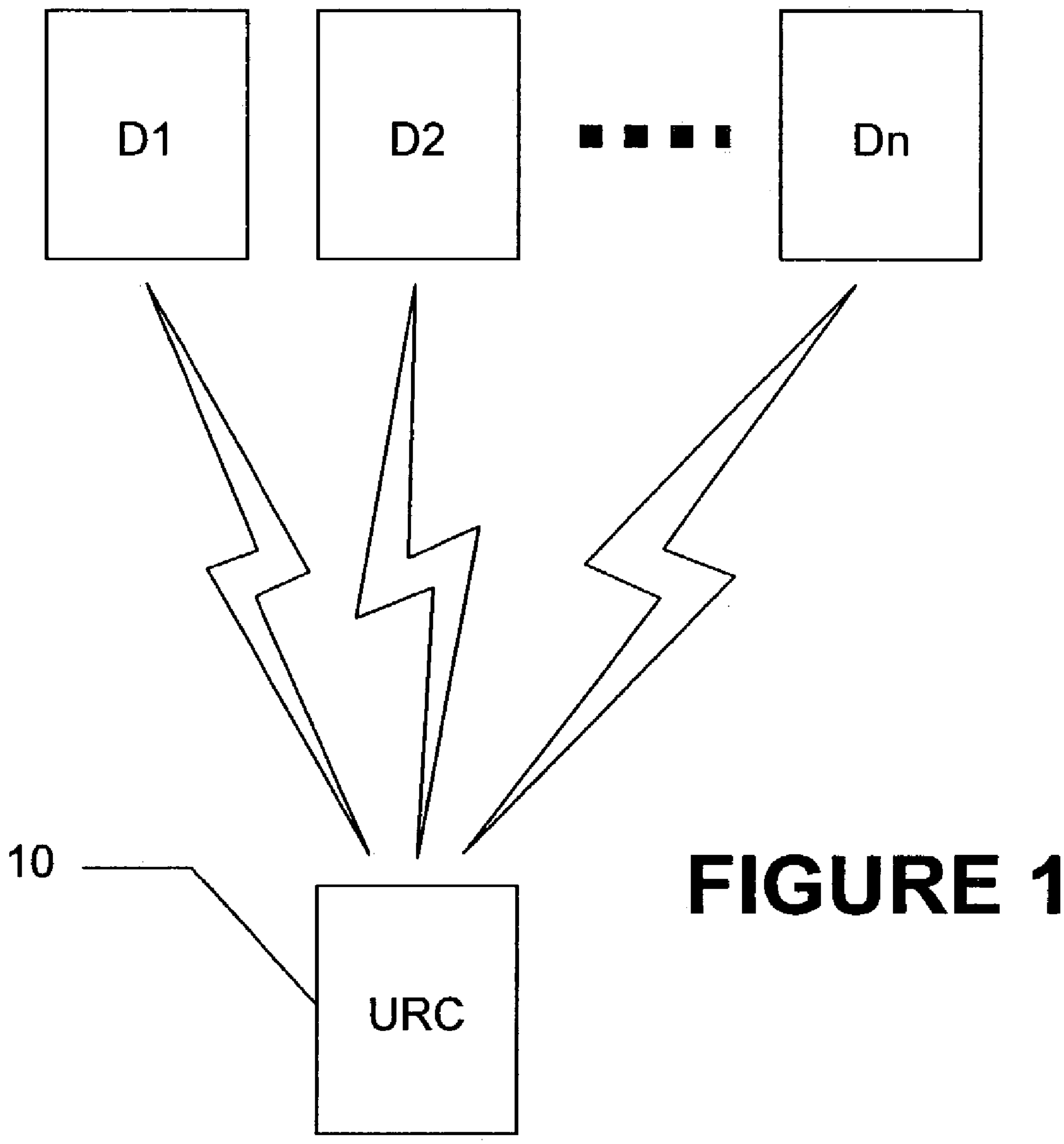
FIG. 1 is a block diagram showing an exemplary universal remote control controlling a variety of consumer electronic devices in accordance with aspects of the present invention.

With reference to FIG. 1, a universal remote control (URC) 10 provides wireless remote control for one or more consumer electronic devices D1 through Dn. The devices D1 through Dn optionally include a variety of different types, e.g., a television, a radio, an audio receiver, an audio cassette deck, a turn table, a compact disc (CD) player, a video cassette record (VCR), a digital video disc (DVD) player, a satellite receiver, a cable box, other audio and/or video equipment, an electronic appliance, a lighting fixture and/or ceiling fan, etc. Further, the devices D1 through Dn may optionally come from a variety of different manufacturers. As is understood in the art, each of the devices D1 through Dn is equipped for wireless remote control via an original remote control (RC) associated therewith. The URC 10 selectively mimics or emulates the original RCs associated with the devices D1 through Dn. It is to be appreciated, that relative to one another, each of the original RCs for the various devices D1 through Dn will typically have different visual appearances, e.g., including different physical keypads with different physical buttons, different keypad layouts, different button configurations, different button designations for different functions, etc. For purposes herein, the term button also refers to switches, keys, dials, sliders, knobs, toggles, and other like input devices or selectors.

Figure 2:
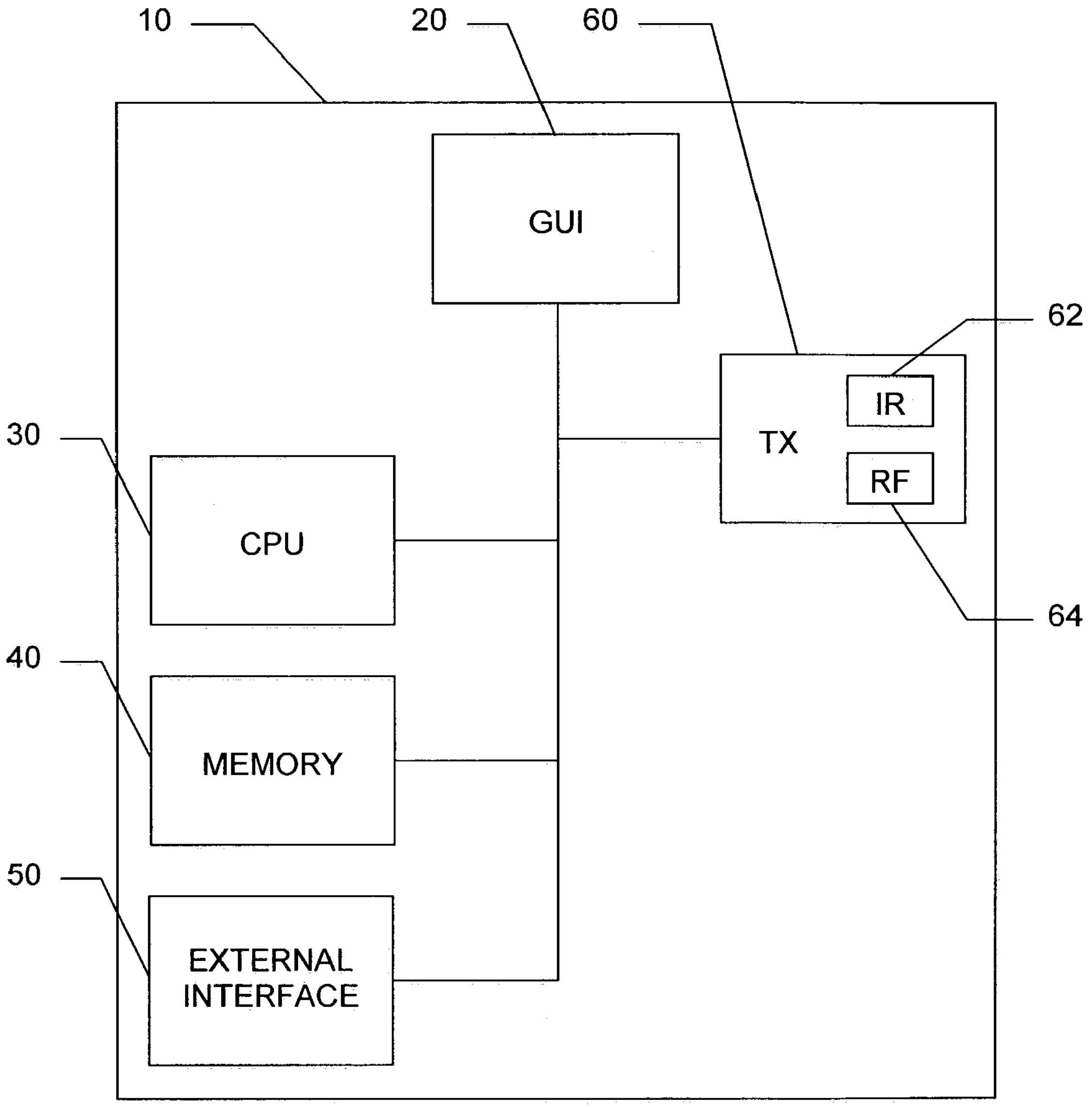
FIG. 2 is a block diagram showing an exemplary architecture for a universal remote control in accordance with aspects of the present invention.

With added reference to FIG. 2, the URC 10 incorporates a graphical user interface (GUI) 20 that is implemented, e.g., on a touch screen liquid crystal display (LCD) or the like. The operation and/or functionality of the URC 10 is regulated and/or administered by a central processing unit (CPU) 30 which is suitably implemented via a microprocessor or the like. A memory 40 or other suitable storage device stores programming for the CPU 30. Also stored and/or maintained in the memory 40 are descriptions and/or specifications for the one or more RCs that are selectively mimicked or emulated by the URC 10.

The URC 10 also incorporates an external interface 50. The external interface 50 is optionally a serial or universal serial bus (USB) port, communication port, or other like port providing connectivity to an external computer or like device. Via the external interface, the URC 10 is selectively loaded with the RC descriptions and/or specifications that are stored in the memory 40. For example, the RC descriptions/specifications may be downloaded from a server over the Internet or read from a magnetic floppy disk or optical disc by an external computer and then uploaded to the URC 10 connected thereto via the interface 50. In this manner, RC descriptions/specifications can be selectively added to the URC 10, e.g., so that the URC 10 can be periodically updated to mimic new RCs as they are developed and/or manufactured, or to program the URC 10 to control new devices as they are acquired by a user. Of course, the URC 10 is suitably provided with one or more selected RC descriptions/specifications already loaded thereon or programmed therein.

A transmitter (TX) 60 optionally includes an infrared (IR) transmitter 62 and/or a radio frequency (RF) transmitter. The transmitter 60 provides the wireless interface with the devices D1 through Dn controlled by the URC 10. That is to say, the transmitter 60 emits the appropriate IR and/or RF signals in response to a user's operation of the URC 10 such that the corresponding devices D1 through Dn are controlled accordingly.

Figure 3:
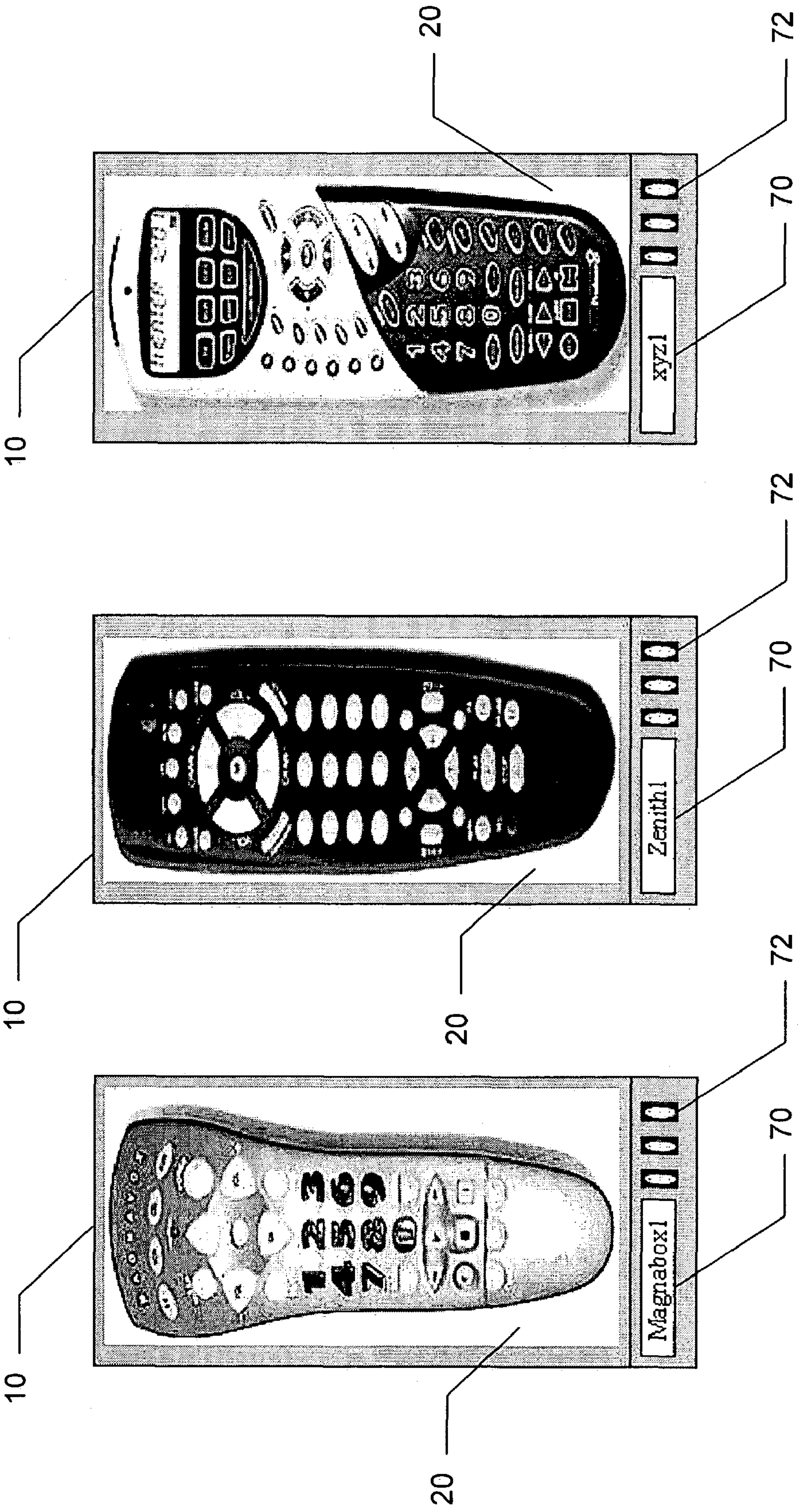
FIG. 3 is a diagrammatic illustration of an exemplary universal remote control having a graphical user interface painted with different original remote controls being emulated in accordance with aspects of the present invention.

With added reference to FIG. 3, each RC description/specification maintained in the memory 40 includes data and/or information regarding the actual visual appearance of the original RC to which the description/specification corresponds. Accordingly, the actual visual appearance of the original RC is replicated on the GUI 20 when the URC 20 is set to mimic or emulate that RC. For example, FIG. 3 shows the URC 10 set to mimic or emulate three different RCs. In each instance, the URC 10 looks-up and/or selects the corresponding RC description/specification from the memory 40 and paints the GUI 20 to replicate the actual visual appearance of the original RC being mimicked or emulated, including for example a keypad having soft buttons that look the same as the physical buttons of the original RC being emulated and that have the same relative location, layout and/or configuration as the original RC being emulated. Accordingly, a user's sense of familiarity with the respective RC being emulated is maintained while using the URC 10.

To operate the URC 20, the user selects an RC to be emulated from the RCs loaded on the URC 20. In response, the URC 10, using the RC description/specification maintained in the memory 40, replicates the actual visual appearance of the original RC on the GUI 20, including its keypad with the buttons in the same layout and/or configuration as the emulated RC. The RC replicated on the GUI 20 is free to be selectively operated in the same fashion as the original RC being emulated, e.g., by pressing or touching on the GUI 20 the soft buttons of the visualized RC.

Suitably, each RC description/specification maintained in the memory 40 also includes a button map. The button map relates each physical button of the respective original RC with a location on the GUI 20 where the corresponding soft button appears when it is visualized thereon. For example, each soft button location is designated by a set of coordinates defining the same. Accordingly, when a selected RC is painted on the GUI 20, touching the touch screen LCD at the location of a depicted soft button is interpreted by the URC 20 the same as if the physical button on the original RC being emulated were pressed. That is to say, the coordinate location of the touching is read from the GUI 20. The button map in the, memory 40 for the RC displayed is consulted. Using the read coordinates, the URC 20 indexes the button map to determine which soft button was pressed, i.e., to identify the physical button on the original RC to which the touched coordinate location corresponds.

Each RC description/specification stored in the memory 40 also includes, e.g., as part of the button map, an identification of the designated transmission signals associated with the physical buttons on the original RC to which description/specification applies. Based upon a touching of the GUI 20 and having identified the corresponding physical button on the original RC being emulated, the URC 20 transmits via transmitter 60 the appropriate signal to achieve the control and/or function assigned to that button.

With added reference to FIG. 4, each RC description/specification is suitably implemented as a record or file including a plurality of data fields. For example, the data fields include: an RC Name that identifies the original RC to which description/specification applies; a visual appearance information field that contains the data used to paint the GUI 20 with the actual visual appearance of the original RC associated with the record; and the button map. As shown, the button map is a table interrelating between one another: the physical buttons B1 . . . Bn of the original RC associated with the record; the coordinate locations (X1, Y1) . . . (Xn, Yn) where the corresponding soft buttons appear on the GUI 20; and, the transmission signals S1 . . . Sn to be emitted by the TX 60 when a button is pressed (i.e., when the coordinate location is touched on the GUI 20). While for exemplary purposes herein the soft button locations have been designated by a single pair of X, Y coordinates, it is to be appreciated that each soft button may in fact encompass a given area, e.g., defined by a set of X, Y coordinates or otherwise specified. Further, it is to be appreciated the RC Name is optionally user programmable or otherwise selected. For example, the RC Name may be "Bedroom TV" or "Living Room Stereo" or any other suitable designation selected by the user.

Returning attention to FIG. 3, upon selection by a user to have the URC 10 emulate a desire original RC stored in the memory 40, the RC Name is suitably displayed in a name display region 70. Optionally, the name display region 70 is part of the LCD upon which the GUI 20 is implemented or may be on a separate display. Optionally, physical buttons 72 or other like input devices are also included on the URC 10. For example, the physical buttons 72 may be employed by a user to select which original RC is to be emulated at given time, i.e., to provide for navigation, selection and/or other similar user input related to the operation of the URC 10 itself. That is to say, the physical buttons 72 may provide for programming of the URC 10 and/or management of the original RCs supported thereon. Alternately, rather than employing the physical buttons 72, the URC 10 optionally employs an "administrative mode" wherein the GUI 20 displays soft button options for navigation, RC selection, administrative and/or management functions, user input, etc., in a menu driven or other like environment. In the administrative mode, the user may, e.g., add or delete original RCs from the memory 40, select which original RC to emulate, control display preferences (e.g., brightness, contrast, resolution, desktop background or wall paper, etc.), and the like. Additionally, in the administrative mode or a separate "game mode", the menu selections may optionally include assorted games that the URC 10 is programmed to play.

Optionally, the GUI 20 supports both the current RC being emulated and the administrative mode functions at the same time. For example, the administrative mode functions are optionally incorporated in a pull-down or pop-up menu bar located along an edge of the touch screen LCD. In this manner, the GUI 20 itself supports navigation between desired RCs being emulated.

It is to be appreciated that the original RCs may at times include physical buttons on their sides and/or backs. Accordingly, the descriptions/specifications for the original RCs also suitably include information and/or data corresponding thereto in the same manner as for the front. Accordingly, when a selected RC is painted on the GUI 20, side and/or back views are optionally displayed along with the front view. For example, the left and/or right sides of the original RC are optionally displayed to the left and/or right, as the case may be, of the front view. Similarly, the back view may be, located above or below the front view. Alternately, the different views may be painted on the GUI 20 one at a time, with the desired view optionally being selected in the same manner as the user would navigate between the different RCs.

It is to be appreciated that particular elements or components described herein may have their functionality suitably implemented via hardware, software, firmware or a combination thereof. Note also that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the invention has been described with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A universal remote control for providing wireless remote control of one or more devices, said devices being equipped for remote control by respective original remote controls having visual appearances different from one another, said universal remote control comprising:

a memory that stores one or more descriptions associated with one or more original remote controls that are selectively emulated by the universal remote control, said descriptions including information describing the visual appearances of the original remote controls that the descriptions are associated with; and, a graphical user interface upon which is displayed a representation of one of the original remote controls selected for emulation by the universal remote control, said representation having a visual appearance substantially the same as the original remote control being emulated.

2. The universal remote control of claim 1, wherein the graphical user interface is implemented on a touch screen liquid crystal display.

3. The universal remote control of claim 1, wherein the representation includes soft buttons that correspond to actual buttons on the original remote control being emulated, said soft buttons having substantially the same appearance and relative location on the graphical user interface as the actual buttons have on the original remote control being emulated.

4. The universal remote control of claim 3, further comprising:

a transmitter that emits signals in accordance with a user touching the soft buttons, said signals emitted from the transmitter mimicking those that the original remote control being emulated emits when the corresponding actual buttons are pressed thereon.

5. The universal remote control of claim 4, wherein the transmitter is an infrared transmitter that emits infrared signals or a radio frequency transmitter that emits radio frequency signals.

6. The universal remote control of claim 1, further comprising:

an external interface, said external interface arranged to receive descriptions for original remote controls from a source external to the universal remote control, said received descriptions being stored in the memory.

7. The universal remote control of claim 6, wherein the external interface is a serial port, a universal serial bus port, or a communications port.

8. A method of emulating one or more original remote controls having visual appearances that are different from one another, said method comprising:

(a) storing descriptions of each original remote control to be emulated, said descriptions including information describing the visual appearances of the original remote controls to which the descriptions apply;

(b) determining which one of the original remote controls to emulate; and, (c) displaying a replica of the original remote control being emulated, said replica having a visual appearance substantially the same as the original remote control being emulated.

9. The method of claim 8, further comprising:

providing in the displayed replica soft buttons that correspond to actual buttons on the original remote control being emulated, said soft buttons having substantially the same appearance and relative location on the replica as the actual buttons have on the original remote control being emulated.

10. The method of claim 9, further comprising:

emitting signals in accordance with a user touching the soft buttons, said emitted signals mimicking those that the original remote control being emulated emits when the corresponding actual buttons are pressed thereon.

11. The method of claim 8, further comprising:

receiving descriptions for original remote controls from a source external to the universal remote control, said received descriptions being stored in step (a).

12. A universal remote control for emulating one or more original remote controls having visual appearances that are different from one another, said universal remote control comprising:

means for storing descriptions of each original remote control to be emulated, said descriptions including information describing the visual appearances of the original remote controls to which the descriptions apply;

means for determining which one of the original remote controls to emulate; and, means for displaying a replica of the original remote control being emulated, said replica having a visual appearance substantially the same as the original remote control being emulated.

13. The universal remote control of claim 12, wherein the means for displaying comprises a touch screen liquid crystal display.

14. The universal remote control of claim 12, further comprising:

means for providing in the displayed replica soft buttons that correspond to actual buttons on the original remote control being emulated, said soft buttons having substantially the same appearance and relative location on the replica as the actual buttons have on the original remote control being emulated.

15. The universal remote control of claim 14, wherein the means for providing comprises a graphic user interface.

16. The universal remote control of claim 14, further comprising:

means for emitting signals in accordance with a user touching the soft buttons, said emitted signals mimicking those that the original remote control being emulated emits when the corresponding actual buttons are pressed thereon.

17. The universal remote control of claim 16, wherein the means for emitting comprises at least one of an infrared transmitter that emits infrared signals or a radio frequency transmitter that emits radio frequency signals.

18. The universal remote control of claim 12, further comprising:

means for receiving descriptions for original remote controls from a source external to the universal remote control, said received descriptions being stored in the means for storing.

19. The universal remote control of claim 18, wherein the means for receiving comprises at least one of a serial port, a universal serial bus port, or a communications port.

20. The universal remote control of claim 1, wherein each description stored in the memory is associated with one of a record or file that includes:

a field that identifies the original remote control associated with the description;

data used to paint the representation of the original remote control associated with the description on the graphical user interface; and, a button map that interrelates coordinate locations on the graphical user interface with signals that are transmitted from the universal remote control in response to the locations being touched.

21. The universal remote control of claim 1, wherein the button map further interrelates the coordinate locations on the graphical user interface with corresponding buttons on the originate remote control associated with the description.

22. The method of claim 8, wherein step (c) comprises:

displaying replicas of a plurality of different sides of the original remote control being emulated, said displayed replicas having visual appearances substantially the same as corresponding sides of the original remote control being emulated.

* * * * *